(12) United States Patent
Kobayashi et al.

(10) Patent No.: US 9,751,783 B2
(45) Date of Patent: *Sep. 5, 2017

(54) METHOD FOR A TREATMENT FOR WASTEWATER CONTAINING ALUMINUM, MAGNESIUM, AND MANGANESE

(75) Inventors: Hiroshi Kobayashi, Niihama (JP); Tatsuya Higaki, Niihama (JP); Hirofumi Shoji, Niihama (JP); Norihisa Toki, Niihama (JP); Keiji Kudo, Niihama (JP); Hiroyuki Mitsui, Tokyo (JP); Osamu Nakai, Tokyo (JP)

(73) Assignee: Sumitomo Mental Mining Co., Ltd., Tokyo (JP)

(*) Notice: Subject to any disclaimer, the term of this patent is extended or adjusted under 35 U.S.C. 154(b) by 101 days.

This patent is subject to a terminal disclaimer.

(21) Appl. No.: 13/583,145

(22) PCT Filed: Jan. 6, 2011

(86) PCT No.: PCT/JP2011/050112
§ 371 (c)(1),
(2), (4) Date: Sep. 6, 2012

(87) PCT Pub. No.: WO2011/111407
PCT Pub. Date: Sep. 15, 2011

(65) Prior Publication Data
US 2013/0001173 A1      Jan. 3, 2013

(30) Foreign Application Priority Data

Mar. 10, 2010  (JP) ................................. 2010-053843
Aug. 3, 2010   (JP) ................................. 2010-174885

(51) Int. Cl.
*B01D 21/01*      (2006.01)
*C02F 1/52*       (2006.01)
(Continued)

(52) U.S. Cl.
CPC .............. *C02F 1/66* (2013.01); *C02F 1/5236* (2013.01); *C02F 1/64* (2013.01); *C02F 1/722* (2013.01);
(Continued)

(58) Field of Classification Search
CPC .......... C02F 1/5236; C02F 1/722; C02F 1/64; C02F 1/72; C01F 5/30; C01F 7/743;
(Continued)

(56) References Cited

U.S. PATENT DOCUMENTS 3,808,123 A * 4/1974 Neel et al. ..................... 210/604
5,298,168 A * 3/1994 Guess .................. C02F 1/5236
                                                    204/DIG. 13
(Continued)

FOREIGN PATENT DOCUMENTS

JP            9-86925         3/1997
JP         09086925 A  *     3/1997 ................ C02F 1/52
(Continued)

OTHER PUBLICATIONS

Morita et al., 1997-086925, Partial Translation of the Japanese Document, paragraph 16, JP 09086925 A, "Production of Alumina gel using surface treatment waste water of Al mat."*
(Continued)

*Primary Examiner* — Clare Perrin
(74) *Attorney, Agent, or Firm* — Gerald E. Hespos; Michael J. Porco; Matthew T. Hespos (57) ABSTRACT

The wastewater treatment method is to obtain demanganized wastewater, through a step wherein an acid or an alkali is added to sulfuric acid acidified wastewater to adjust pH to not less than 4.0 and not more than 6.0, whereby the sulfuric acid acidified wastewater is separated into a dealuminized solution and an aluminum precipitate; a step wherein a slurrying solution is added to the aluminum precipitate to
(Continued)

form a slurry, then an alkali is added to adjust pH to not less than 9.0 and not more than 9.5, whereby an pH-adjusted aluminum precipitate slurry is formed; a step wherein an alkali is added to the dealuminized solution to adjust pH to not less than 8.0 and not more than 9.0; and others.

9 Claims, 6 Drawing Sheets (51) Int. Cl.
| | |
|---|---|
| B03D 3/00 | (2006.01) |
| C02F 1/78 | (2006.01) |
| C22B 47/00 | (2006.01) |
| C01F 7/00 | (2006.01) |
| C22B 21/00 | (2006.01) |
| C02F 1/72 | (2006.01) |
| C02F 1/66 | (2006.01) |
| C02F 1/64 | (2006.01) |
| B01D 21/00 | (2006.01) |
| C02F 1/00 | (2006.01) |
| C01G 45/00 | (2006.01) |
| C01F 1/00 | (2006.01) |
| C01G 45/02 | (2006.01) |
| C02F 101/20 | (2006.01) |

(52) U.S. Cl.
CPC ............... *C02F 1/78* (2013.01); *C01G 45/02* (2013.01); *C02F 1/72* (2013.01); *C02F 2101/20* (2013.01); *C02F 2101/206* (2013.01); *C02F 2209/06* (2013.01); *C22B 47/00* (2013.01)

(58) Field of Classification Search
CPC ......... C01F 11/18; C22B 47/00; C01G 45/02; C01P 2004/61; C01B 33/46; C01B 25/328
USPC ....... 210/702, 721–726, 709, 738, 739, 743, 210/749, 758–760, 767, 85, 86, 96.1, 97, 210/198.1, 912; 423/49, 50, 111, 131, 423/132, 155, 157, 157.3, 157.4, 158; 75/710, 739
See application file for complete search history.

(56) References Cited

U.S. PATENT DOCUMENTS

| | | | |
|---|---|---|---|
| 5,505,857 | A | 4/1996 | Misra et al. |
| 6,656,247 | B1 * | 12/2003 | Genik-Sas-Berezowsky et al. ............... 423/50 |
| 7,033,507 | B2 * | 4/2006 | Zhuang ................ 210/714 |
| 7,258,793 | B2 * | 8/2007 | Kurabayashi et al. ....... 210/617 |

FOREIGN PATENT DOCUMENTS

| | | |
|---|---|---|
| JP | 9-512780 | 12/1997 |
| JP | 3225836 | 8/2001 |
| JP | 2005-125316 | 5/2005 |
| JP | 2009-11897 | 1/2009 |

OTHER PUBLICATIONS

Full English Translation of Morita et al. (JP 1997-086925): "Method for producing alumina gel using surface treatment waste water of aluminum material and method for producing crystalline aluminum hydroxide", publication: Mar. 31, 1997.*

* cited by examiner

METHOD FOR A TREATMENT FOR WASTEWATER CONTAINING ALUMINUM, MAGNESIUM, AND MANGANESE

BACKGROUND OF THE INVENTION

1. Field of the Invention

The present invention relates to a method for separating manganese from magnesium and removing manganese from sulfuric acid acidified wastewater which contains aluminum, magnesium, and manganese simultaneously.

2. Description of the Related Art

Wastewater generating at factories sometimes contains heavy metals originating from processes or from raw materials, and cannot be discharged to the outside of a system, such as to a river and to a sea area, without any treatment. Therefore, used is, for example, a method shown in Japanese Unexamined Patent Publication No. 2005-125316, in which the above-mentioned wastewater is sent to a wastewater treatment process, and a neutralizing agent is added thereto to adjust pH, and contained metal ions are made into a precipitate form of hydroxide or the like and separated from the wastewater, and then the wastewater after separated from heavy metals is discharged to the outside of a system.

However, when heavy metals are separated from wastewater as a precipitate, the heavy metals is not easily fixed in the precipitate stably, and the treatment sometimes takes a great deal of time and effort and cost. For example, in the case of acidic wastewater containing manganese, in order to stably fix manganese as a hydroxide precipitate, a pH of the wastewater has to be adjusted in a range of 8 to 10. To this end, it is necessary that, by adding a large amount of alkaline slurry of calcium hydroxide or the like, neutralization is performed to make the wastewater alkaline from strongly acidic.

Furthermore, for example, in the case of wastewater which generates after recovering valuable metals by acid-leaching of ore, besides manganese, magnesium is also often contained. Magnesium does not affect environment, and therefore, unlike manganese, does not need to be removed from wastewater, but, at the time of a precipitation treatment of manganese, a precipitate containing magnesium is formed simultaneously, and therefore a neutralizing agent with an amount required for generating the precipitate of magnesium is consumed, and accordingly a neutralizing agent with an excessive amount more than a chemical equivalent required for generating manganese hydroxide is required. Thus, an increase in an amount of a neutralizing agent consumed causes not only cost rise but also an increase in an amount of a generated precipitate, thereby increasing the time and effort of the treatment, and therefore is not preferable. Further, when an amount of the precipitate increases, a manganese grade in the precipitate relatively decreases, and there arises a harmful effect which is such that reuse of manganese as resources becomes disadvantageous in cost.

Therefore, for example, Japanese Unexamined Patent Publication No. 3225836 discloses a method for preferentially removing manganese from an acidic solution containing magnesium and manganese.

The method disclosed in Japanese Unexamined Patent Publication No. 3225836 is a method wherein a neutralizing agent is added to an acidic solution, which is obtained by acid-leaching a nickel oxide ore and contains 1 to 3 g/L of manganese and 2 to 15 g/L of magnesium, to adjust a pH of the solution in a range of 8.2 to 8.8, while air, oxygen, ozone, or peroxide is added thereto so that an oxidation-reduction potential (ORP) is adjusted to be maintained at a range of 50 to 300 mV in an electric potential measured with a silver-silver chloride electrode, whereby manganese is preferentially precipitated and removed.

Since use of this method enables manganese to be removed prior to magnesium, consumption of a neutralizing agent for precipitate generation of magnesium can be controlled, and an amount of the neutralizing agent used can be saved.

However, a solution shown in Japanese Unexamined Patent Publication No. 3225836, which is obtained after an sulfuric acid acidified solution obtained by leaching a nickel oxidation ore with sulfuric acid is sulfurized to separate nickel as a sulfide, often contains aluminum besides magnesium and manganese, and when a wastewater treatment is performed for such an acidic aqueous solution containing aluminum, even by using the method disclosed in Japanese Unexamined Patent Publication No. 3225836, a considerable amount of magnesium also precipitates together with manganese, and a neutralizing agent is excessively required.

The excessive use of a neutralizing agent is described with an example thereof. First, a sulfuric acid acidified aqueous solution having a manganese concentration of 3.4 g/L, a magnesium concentration of 8.4 g/L, and an aluminum concentration of 0.5 to 2.0 g/L is placed into a beaker having a capacity of 0.2 liters, and a solution temperature is maintained at 50 degrees C. by using a water bath. Next, a calcium hydroxide slurry having a concentration of 20% by mass is added to the aqueous solution to adjust pH to 8.0, and when the pH becomes stable, while an oxidation-reduction potential (ORP) of the solution is measured by using a silver-silver chloride electrode as a reference electrode, pure oxygen gas is blown from a cylinder into the solution in the beaker at a flow rate of 1 liter per minute, followed by maintaining for 30 minutes. The oxidation-reduction potential at that time was around 200 mV. Then, the solution in the beaker was solid-liquid separated, and a recovered precipitate was analyzed to calculate a removal amount of aluminum and magnesium.

Figure 1:
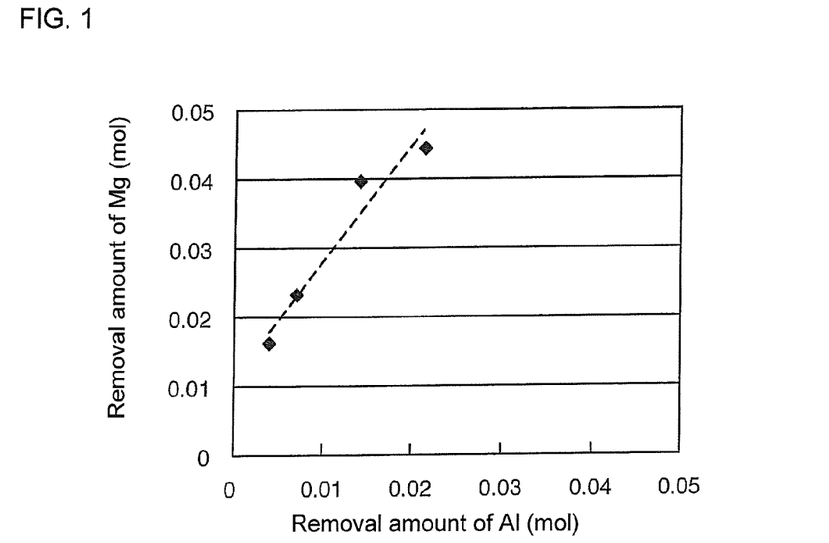
FIG. 1 shows a relation of a removal amount of magnesium with respect to a removal amount of aluminum.

As shown in FIG. 1, with a molar ratio of magnesium to aluminum in the precipitate (Mg/Al) being maintained at around 2, magnesium also precipitates, whereby it is understood that a neutralizing agent is excessively required.

Thus, due to wastewater containing aluminum, the treatment method described in Japanese Unexamined Patent Publication No. 3225836, in which the above-mentioned oxidation and neutralization are performed, cannot control coprecipitation of magnesium with manganese, and therefore is uneconomical. Accordingly, there has been sought a method wherein, while precipitation of magnesium being controlled, manganese is precipitated and separated from a sulfuric acid acidified solution containing aluminum, magnesium, and manganese.

Therefore, the present invention provides a wastewater treatment method for efficiently removing manganese selectively from sulfuric acid acidified wastewater containing aluminum, magnesium, and manganese.

SUMMARY OF THE INVENTION

A first aspect of the present invention to solve the problem provides a wastewater treatment method, wherein, from a sulfuric acid acidified wastewater containing aluminum, magnesium, and manganese, demanganized wastewater is obtained, through the following steps (1) to (5), in such a manner that, while precipitation of magnesium being controlled, manganese is precipitated and separated.

(1) A step wherein an acid or an alkali is added to sulfuric acid acidified wastewater, and pH of the wastewater is adjusted in a range of not less than 4.0 and not more than 6.0, whereby the sulfuric acid acidified wastewater is separated into a dealuminized solution and an aluminum precipitate.

(2) A step wherein a slurrying solution is added to the aluminum precipitate obtained in the step (1) to form a slurry, and then an alkali is added and the pH is adjusted in a range of not less than 9.0 and not more than 9.5, whereby a pH-adjusted aluminum precipitate slurry is formed.

(3) A step wherein an alkali is added to the dealuminized solution obtained in the step (1) to perform pH adjustment to a range of not less than 8.0 and not more than 9.0, and then an oxidizing agent is added to perform oxidation neutralization, whereby an oxidized and neutralized slurry is formed.

(4) A step wherein the oxidized and neutralized slurry obtained in the step (3) is solid-liquid separated to separate into a manganese precipitate and demanganized wastewater.

(5) A step wherein the pH-adjusted aluminum precipitate slurry obtained in the step (2) is solid-liquid separated to separate into an aluminum hydroxide precipitate and a filtrate.

A second aspect of the present invention provides the wastewater treatment method, wherein the alkali used for the pH adjustment in the steps (1) to (3) of the first aspect is an alkali including any one or more kinds of the aluminum hydroxide precipitate, the filtrate, the demanganized wastewater, calcium carbonate, calcium hydroxide, calcium oxide, slaked lime, sodium hydroxide, and potassium hydroxide.

A third aspect of the present invention provides the wastewater treatment method, wherein the slurrying solution to be added to the aluminum precipitate in the step (2) of the first and second aspects is any one or more kinds of water, an alkaline aqueous solution, the oxidized and neutralized slurry, the demanganized wastewater, the pH-adjusted aluminum precipitate slurry, and the filtrate.

A fourth aspect of the present invention provides the wastewater treatment method, wherein the oxidizing agent to be added to the pH-adjusted dealuminized solution in the step (3) of the first to third aspects is any one or more kinds of air, ozone gas, a hydrogen peroxide solution, sulfur dioxide gas, and oxygen.

A fifth aspect of the present invention provides the wastewater treatment method, wherein an oxidizing agent is added to the dealuminized solution which has been pH-adjusted in the step (3) of the first to fourth aspects and stored in a high-pressure vessel.

A sixth aspect of the present invention provides the wastewater treatment method, wherein the sulfuric acid acidified wastewater in the first to fifth aspects is a solution obtained in such a manner that nickel and cobalt, each contained in an nickel oxide ore, are leached with sulfuric acid by high-pressure acid leaching, and the obtained sulfuric acid acidified solution is neutralized to be separated from impurities, then the obtained neutralized solution is sulfurized to separate nickel and cobalt as a sulfide precipitate.

A seventh aspect of the present invention provides the wastewater treatment method, wherein the filtrate in the first to sixth aspects which is separated from the aluminum hydroxide precipitate obtained by the pH adjustment in the step (5) is repeatedly used as an alkali to be added in any one or more steps (1), (2), and (3) as above.

According to the present invention, industrially remarkable effects shown below are achieved.

(a) While coprecipitation of magnesium is controlled, manganese is capable of being separated from sulfuric acid acidified wastewater containing aluminum, magnesium, and manganese.

(b) Since an amount of a neutralizing agent required to be added decreases, cost can be reduced.

(c) Since a generating amount of a precipitate decreases, equipment capacity is reduced and investment can be cut down. At the same time, a volume of a dumping space can be reduced, which is also environmentally preferable.

(d) Since precipitation of magnesium is controlled, a manganese grade in a precipitate can be increased and cost for recycle and reuse of manganese can be reduced.

DETAILED DESCRIPTION OF THE PREFERRED EMBODIMENTS

The present invention provides a wastewater treatment method, wherein, while coprecipitation of magnesium is controlled, manganese and aluminum are precipitated and separated from sulfuric acid acidified wastewater containing aluminum, magnesium, and manganese.

Wastewater to be treated in the present invention is not particularly limited, but, a particularly great effect is exhibited, for example, in a solution which contains magnesium at a concentration equivalent to or more than that of manganese and furthermore contains aluminum at a concentration equal to or more than a hundredth of that of manganese.

As a specific example of wastewater for which the wastewater treatment method of the present invention is employed, there can be mentioned a wastewater which remains after leaching a nickel oxide ore with sulfuric acid by high-pressure sulfuric acid leaching, and adjusting pH of the obtained leachate to separate impurities, and furthermore adding a sulphidizing agent to separate nickel and cobalt. This wastewater contains manganese at a concentration level of 2 to 6 g/L, magnesium at a concentration level of 3 to 12 g/L, and aluminum at a concentration level of 2 to 6 g/L, and the wastewater treatment method of the present invention is preferably applicable thereto.

According to the present invention, an alkali is added to wastewater containing aluminum to form a slurry, followed by solid-liquid separation into a precipitate and a filtrate. For the solid-liquid separation, besides a method of separating a precipitate in a semi-slurry state with a high water content by using a thickening apparatus, usable are various methods, such as a method of recovering as a precipitate from which water is wrung out using filtering machinery, such as a filter press and a centrifugal separator.

However, even if any one of the methods are used, some adhering water cannot be avoided, and particularly in the case where an aluminum hydroxide is unstable and has a property to incorporate metal ions contained in adhering water into a crystal structure of the aluminum hydroxide, disposal without any treatment sometimes causes a problem.

Therefore, in the present invention, a slurrying solution, such as water, is added to the obtained precipitate to reslurry and furthermore an alkali is added thereto to chemically stabilize an aluminum hydroxide, whereby a hydrotalcite-like compound hydroxide is prevented from being formed, while the treatment in which an alkali is added to adjust and maintain pH in an alkali range enables aluminum to be stabilized and, at the same time, enables elution of heavy metals contained in adhering water to an aluminum precipitate to be controlled.

Therefore, when a precipitate of aluminum hydroxide is separated from the aluminum precipitate slurry which is obtained by slurring the aluminum precipitate as mentioned above, even if any method is used, an aluminum hydroxide to be obtained shows no difference in stability, and is stable.

In addition, since Al ions are not substantially contained in a filtrate which remains after separating an aluminum hydroxide precipitate by the above-mentioned method (dealuminized filtrate), a hydrotalcite-like compound hydroxide is hard to form, and, when the filtrate is used for pH adjustment in which an oxidizing agent is charged in a downstream process to precipitate manganese ions in oxide form, coprecipitation of magnesium and aluminum is controlled, therefore consumption of a neutralizing agent to be newly added (particularly, an alkaline aqueous solution) is greatly controlled.

To describe the above in more detail, when the pH of a solution containing Al ions is adjusted in a range of 4.0 to 6.0, an aluminum hydroxide is formed and precipitated. Then, when the pH is raised to a range of 7.0 to 8.0, this aluminum hydroxide not exists stably in a state of a simple aluminum hydroxide precipitate which is generally represented as [$Al(OH)_3$], but exists metastably as a hydrotalcite type compound which incorporates coexisting divalent metal ions, such as magnesium ions, in a form of basic double salt (aluminum compound hydroxide), and it is considered that, in this metastable state, a neutralizing agent is consumed excessively.

Particularly when coexisting with magnesium, this aluminum compound hydroxide metastably incorporates magnesium in an amount equivalent to up to 6 times the amount of aluminum, and coprecipitates therewith, and accordingly it is considered that, as a result, an amount of a neutralizing agent used corresponding to this also increases.

Figure 6:
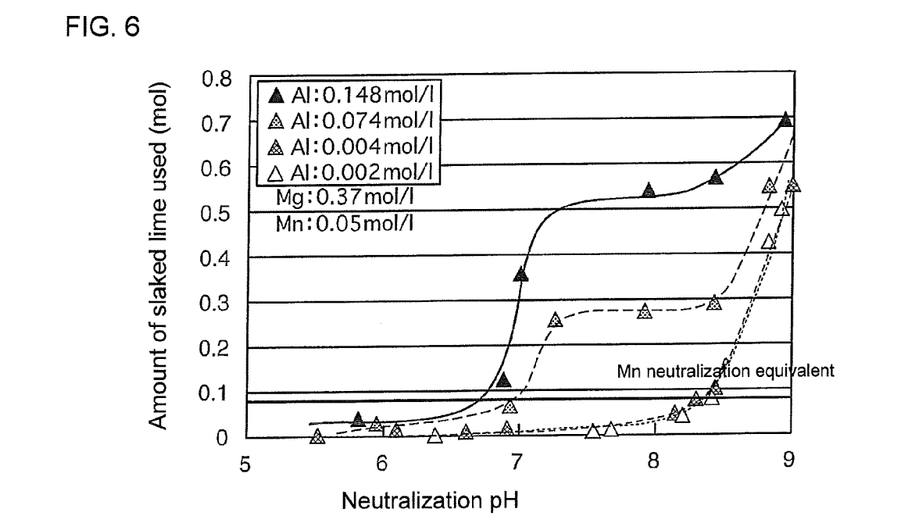
FIG. 6 shows a relation between pH of a neutralization reaction and an amount of a neutralizing agent.

Then, to describe this specifically by an experiment conducted by the inventors, aluminum sulfate was added to a sulfuric acid acidified wastewater containing 2.7 g/L (0.05 mol/L) of manganese and 9.0 g/L (0.37 mol/L) of magnesium to change an aluminum concentration to 0.05 g/L (0.002 mol/L), 0.10 g/L (0.004 mol/L), 2.0 g/L (0.074 mol/L), and 4.0 g/L (0.148 mol/L), and slaked lime was added to this wastewater to adjust the pH to 5.5, and then the pH was changed to 8.5 with maintaining a slurry state where an aluminum hydroxide existed, and a sample of the wastewater was taken to investigate an amount of a neutralizing agent required for neutralization until a manganese concentration reached less than 1 mg/L. FIG. 6 shows the results.

As is clear from FIG. 6, it is understood that an amount of the neutralizing agent used increases rapidly at around pH 7, and required is slaked lime in an amount approximately 5 to 7 times approximately 0.1 mol equivalent which is originally required to neutralize manganese.

Therefore, the present invention is achieved, based on the consideration that, if formation of the aluminum compound hydroxide can be controlled, coprecipitation of magnesium is controlled and a neutralizing agent can be reduced accordingly.

In other words, in the present invention, first, wastewater is neutralized at a pH lower than the conventional pH to preferentially form an aluminum hydroxide and make a slurry. Then, filtration is performed to separate aluminum hydroxide as a precipitate (aluminum precipitate) and thereby obtain a wastewater (dealuminized solution), and at the same time, the obtained wastewater is neutralized again so as to separate other bivalent metal ions contained in the obtained wastewater as hydroxides, and to adjust the pH to the same range of not less than 8.0 and not more than 9.0 as the conventional pH, and furthermore, an oxidizing agent is added for oxidization to separate manganese without coprecipitation of magnesium. Such steps enables precipitation of magnesium to be controlled and an amount of a neutralizing agent consumed for the precipitation of magnesium to be reduced.

Moreover, the aluminum precipitate obtained by first separating an aluminum hydroxide as a precipitate is brought into contact with an alkali solution, whereby a form of the aluminum precipitate is chemically stabilized. Note that, although heavy metals sometimes partially adhere to a surface of the aluminum hydroxide, this stabilizing treatment also prevents the heavy metals from being eluted from the precipitate.

Thus, by employing the method of the present invention, even if metals contained in wastewater are fixed as precipitates, a situation where the metals are eluted into the environment can be prevented.

Then, in the present invention, there is used a treatment method in which a sulfuric acid acidified wastewater containing aluminum is pH-adjusted in two stages.

That is, as mentioned above, in a first stage, an aluminum hydroxide is first adjusted to have a relatively low pH and thereby separated once from the sulfuric acid acidified wastewater, as an aluminum precipitate (precipitate or slurry in form of aluminum hydroxide), and the precipitate in form of aluminum hydroxide is slurried again, then, in a second stage, neutralization is performed to adjust pH in a range of not less than 9.0 and not more than 9.5, whereby the aluminum hydroxide is chemically stabilized.

Thus, an aluminum precipitate is separated as an aluminum hydroxide, and the separated aluminum precipitate or the separated slurry is stabilized independently, whereby a neutralizing agent is not consumed excessively and neutralization cost can be reduced.

Hereinafter, with reference to a process flowchart in FIG. 7, each step will be specifically described.

Step (1):

First, pH of sulfuric acid acidified wastewater is adjusted to separate aluminum from the wastewater (pH adjustment—1). A concentration of aluminum contained in a dealuminized solution obtained after the pH adjustment is determined in view of a permissible amount of magnesium or aluminum to a manganese precipitation in the next step, specifically not more than 0.1 g/L, preferably not more than 0.01 g/L.

In order to separate aluminum by neutralization and achieve the above-mentioned concentration or less, an alkali is added to sulfuric acid acidified wastewater to adjust the pH in a range of 4 to 6, preferably in a range of 4 to 5.

When the pH is less than 4, an aluminum precipitate is insufficiently formed, and an amount of aluminum remaining in the solution increases. Thus, the stabilizing treatment of aluminum hydroxide, which is characteristic of the present invention, is not performed and aluminum remains, and therefore, in oxidation in a downstream step, aluminum which coprecipitates with magnesium increases to reduce an advantageous effect of the present invention.

On the other hand, when the pH exceeds 6, there is a possibility that, at the time of pH adjustment, pH rises locally to generate coprecipitation of magnesium, and an amount of a precipitate increases. In order to prevent influence of the local pH rise, the upper limit of pH to be adjusted is preferably not more than 5.

Thus, when pH is adjusted in a range of 4 to 6, aluminum precipitates as an aluminum hydroxide, and can be treated properly by adding almost the same as the theoretical equivalent of a neutralizing agent.

As the neutralizing agent to be used, alkali, such as calcium carbonate or calcium hydroxide, can be added in solid or slurry form.

Next, the pH-adjusted sulfuric acid acidified wastewater is solid-liquid separated into a precipitated aluminum precipitate (precipitate of aluminum hydroxide) and a dealuminized solution as a liquid portion.

The precipitate in this solid-liquid separation is separated as a concentrated slurry by using a thickening apparatus, or recovered as a precipitate by using a filter press or the like. Note that, since this precipitate is stabilized by being slurried again, it is not necessary to completely dry the aluminum precipitate generated here.

To the obtained aluminum precipitate or the obtained concentrated slurry, a large amount of dealuminized solution adheres. Since manganese and a large amount of other impurities coexist in this adhering dealuminized solution, it is not preferable that the precipitate or the slurry is dried without any treatment, and discarded in deposit form, because it is feared that these adhering impurities could elute and harm the surrounding environment.

Step (2):

Then, when recovered as a precipitate, the aluminum precipitate separated in the previous step is slurried again by adding a slurrying solution, such as water, and, when recovered as a concentrated slurry, the aluminum precipitate is used as it is in the next step.

Next, as explained above, an alkali is added to the produced slurry to adjust pH in a range of not less than 9.0 and not more than 9.5, whereby a pH-adjusted aluminum precipitate slurry is formed (pH adjustment—2). This treatment is to chemically stabilize an aluminum hydroxide in the slurry so as to prevent formation of a hydrotalcite-like hydroxide. Simultaneously, coexisting manganese ions are completely precipitated and separated. At this time, magnesium ions which exist in small quantities as adhering water are completely neutralized.

Note that, as a slurrying solution to be added at the time of slurring the aluminum precipitate, besides water, usable is a solution obtained in the present invention, which remains after separating manganese (demanganized wastewater), a precipitate obtained by oxidizing manganese after dealuminization (oxidized and neutralized slurry), a pH-adjusted aluminum precipitate slurry obtained by performing pH adjustment to stabilize an aluminum hydroxide, or a filtrate obtained in solid-liquid separation of the slurry, and furthermore, an alkaline aqueous solution in an amount required for the predetermined pH may be added to perform slurrying and pH adjustment simultaneously.

Step 3:

On the other hand, an alkali is added to a dealuminized solution from which aluminum is separated (hereinafter, may be referred to as a dealuminized solution) to adjust pH in a range of 8.0 to 9.0 (pH adjustment—3). If pH increases too much, cost of an alkali to be added increases, and in addition, aluminum which remains as a suspended solid or the like tends to be redissolved, therefore a pH not more than 9.0 is suitable.

As an alkali used for these pH adjustments, a filtrate formed by solid-liquid separation of the pH-adjusted aluminum precipitate slurry in which an aluminum hydroxide is stabilized, and demanganized wastewater are reusable in the present invention, and use of these enables a consumption amount of alkali which is newly used, such as calcium hydroxide, to be greatly controlled. Note that the stabilized aluminum hydroxide precipitate is also usable as an alkali to be added for this pH adjustment (The pH of the dealuminized solution obtained by adjusting pH of sulfuric acid acidified wastewater to 4 to 6 is adjusted to a range of 8 to 9./pH adjustment—3), but is used in a range not exceeding the permissible amount of aluminum to the dealuminized solution.

Next, an oxidizing agent is added to oxidize contained divalent manganese ions to trivalent manganese ions, whereby an oxidized and neutralized slurry containing oxide of manganese is formed.

This oxidation is preferably performed in such a manner that, first, a neutralizing agent (alkaline component) is added and a pH of wastewater reaches a state of equilibrium, then an oxidizing agent is added. In other words, in the case where a solid is used as a neutralizing agent, oxygen gas is blown after the equilibrium pH is reached, whereby an amount of the neutralizing agent consumed can be reduced.

As an oxidizing agent to be used, air, oxygen, ozone, peroxide, or sulfur dioxide is usable, but, in view of efficiency and handling easiness, a method of supplying oxygen gas from a cylinder or the like and blowing the oxygen gas into a solution through a sintered glass, a pipe, or the like is most suitable.

Then, as an amount of the oxygen gas to be blown, an amount required to oxidize divalent manganese ions in a solution to trivalent manganese ions is enough. Specifically, while an oxidation-reduction potential of wastewater is measured using a silver-silver chloride electrode as a reference electrode, an amount of oxygen gas to be blown is adjusted so that the oxidation-reduction potential is within an electric potential range of 50 to 300 mV, in which, generally, divalent manganese ions are changed to trivalent manganese ions; or an amount of oxygen gas to be blown is controlled by taking a sample of wastewater and then conducting a chemical analysis of the valence of manganese ions. Note that, since oxygen gas is hard to be dissolved in a solution, a dissolved oxygen amount is preferably increased using a pressure vessel.

Note that, as in the present invention, when an sulfuric acid acidified solution is oxidized to precipitate manganese as an oxide, pH is preferably adjusted prior to adjustment of an oxidation-reduction potential by adding an oxidizing agent.

The reason for this is that, when an oxide is formed in a solution, remaining sulfate ions (SO42-) incorporate hydrogen ions in the solution to re-form sulfuric acid, and, as a result, a pH value of the solution partially falls. When a pH of the solution partially falls, the formed oxide is easily dissolved there, and, as a result, an added oxidizing agent is wasted and efficiency of precipitate formation falls. Therefore, it is preferable that a pH of the solution is raised in advance, and maintained in a pH range where, even if sulfuric acid is formed, precipitate redissolution is controlled, and then oxidation is started.

For the above-mentioned reason, a reaction vessel for the oxidation reaction and a reaction vessel for the neutralization reaction are preferably prepared separately. By using separate reaction vessels, surfaces of added calcium hydroxide powders temporarily have a high pH value, whereby magnesium can be prevented from being precipitated as a hydroxide, and also, an amount of a neutralizing agent consumed can be prevented from increasing. Furthermore, a situation where manganese is insufficiently oxidized is also avoidable.

This neutralization vessel is preferably capable of securing a not less than 30 minute residence time in order to perform a reaction stably and securely, while, as an oxidation vessel, a high-pressure vessel is preferably used. In other words, oxygen gas is hard to be dissolved in an aqueous solution having a high salt concentration like the wastewater obtained by leaching low grade nickel oxidation ore, and the oxidation rate of manganese is influenced, and therefore, it is effective to raise oxygen partial pressure by using a high-pressure vessel to increase a dissolved oxygen amount in wastewater.

Steps (4) and (5):

The two kinds of slurry obtained in the above steps may be disposed by burial without mixing, thereby can be treated with maintained chemically stable, but, from a viewpoint of reuse of resources, it is more preferable to separately perform a solid-liquid separation of a oxidized and neutralized slurry containing a manganese oxide, and a solid-liquid separation of a stabilized aluminum precipitate slurry (pH-adjusted aluminum precipitate slurry).

When the solid-liquid separation is performed, both of an aluminum hydroxide precipitate (after stabilization) and a filtrate, each formed by solid-liquid separation of the stabilized aluminum precipitate slurry (pH-adjusted aluminum precipitate slurry), are usable as an alkali used for pH adjustment of sulfuric acid acidified wastewater and pH adjustment for forming an pH-adjusted aluminum precipitate slurry. Furthermore, the filtrate is usable also for pH adjustment of the dealuminized solution.

On the other hand, the demanganized wastewater formed by solid-liquid separation of the oxidized and neutralized slurry is also usable as an alkali used for the pH adjustment of sulfuric acid acidified wastewater and the pH adjustment of the dealuminized solution.

Thus, end products in the recovery process of the present invention, such as the filtrate and the demanganized wastewater, are re-usable, and greatly contribute to the control of an amount of alkali used during wastewater recovery treatment.

Furthermore, it is no problem to perform solid-liquid separation after mixing the oxidized and neutralized slurry containing a manganese oxide with the stabilized aluminum precipitate slurry (pH-adjusted aluminum precipitate slurry).

In other words, magnesium coexists in a liquid portion of the slurry containing manganese oxide, but, the state of the mixed aluminum hydroxide is stabilized, and therefore, even if magnesium, which has a high affinity for aluminum, exists around aluminum hydroxide particles, a magnesium precipitate is not formed.

As a result, it does not happen that magnesium consumes a neutralizing agent to form a precipitate, and therefore, neutralization cost can be reduced and an amount of a precipitate formed also decreases. Moreover, magnesium which coexists in the aluminum precipitate slurry containing the stabilized aluminum hydroxide precipitate is mixed with magnesium in the slurry containing a manganese oxide, and solid-liquid separated by single equipment, thereby has effects leading to reduction in production man-hour and the number of equipment.

From the viewpoints of simplifying equipment and reducing cost, it is desirable to mix and treat these two slurry, but, when the both are mixed, an ion exchange reaction of magnesium ions contained in the filtrate and protons in the precipitate obtained by stabilizing aluminum hydroxide is caused, and, as time progresses, pH gradually decreases, whereby the phenomenon of elution of manganese sometimes occurs, and therefore, the shorter the time until the treatment is performed after the mixing is, the more preferable it is.

Note that, in the case where, without using the method of the present invention, as in the conventional method, sulfuric acid acidified wastewater is tried to be adjusted from a strong acid state of approximately pH 2 to 4, or less, straightaway to a state of pH 8 or more where an aluminum hydroxide can stably exist, while pH adjustment is advanced, aluminum compound hydroxide is formed and simultaneously coprecipitation of magnesium preferentially occurs, and therefore, precipitation of manganese does not progress smoothly, and a more excessive neutralizing agent is required.

EXAMPLES

Hereinafter, the present invention will be explained in detail with reference to Examples and Comparative Examples. Note that concentrations of metal ions were quantified using ICP emission analysis.

Example 1

First, nickel, cobalt, and the like, which are contained in a nickel oxidation ore, are leached in a sulfuric acid solution by high-pressure acid leaching, and a pH of the obtained leachate is adjusted. A sulphidizing agent was added to the pH-adjusted leachate to separate nickel and cobalt as sulfides. Analysis values of wastewater after sulfurization obtained after the separation were such that a manganese concentration was 2.90 g/L, a magnesium concentration was 7.81 g/L, an aluminum concentration was 2.90 g/L, and an iron concentration was 0.40 g/L, and the pH was 2.5.

Figure 7:
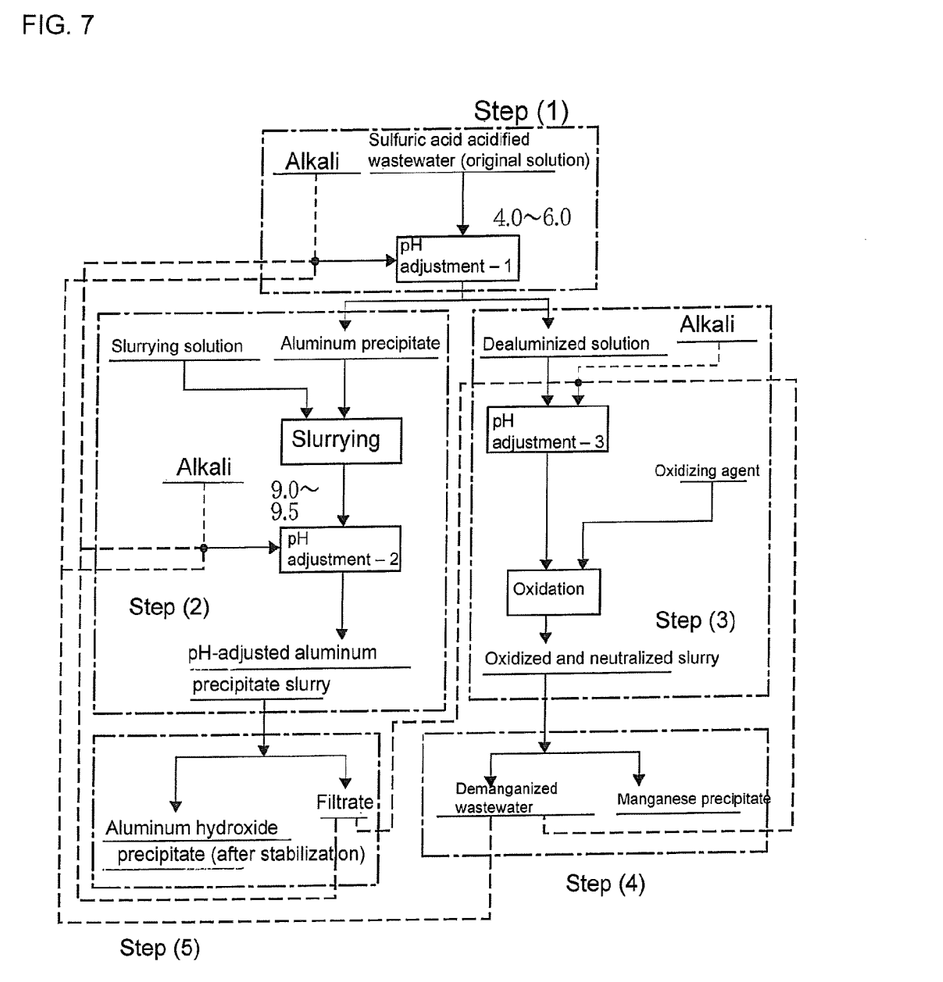
FIG. 7 shows a process flowchart of a wastewater treatment method of the present invention.

After recovering the nickel and the cobalt, as shown in a process flowchart in FIG. 7, a wastewater treatment is performed using sulfuric acid acidified wastewater after sulfurization as an original solution.

First, a sulfuric acid acidified wastewater of pH 2.5 was put into a reaction vessel made of heat-resistant glass and having a capacity of 2 liters, and, while maintaining the temperature at 60 degrees C. and stirring, a calcium hydroxide slurry having a concentration of 20% by mass was added thereto to adjust pH to 4.5 (FIG. 7: pH adjustment—1). Then, solid-liquid separation was performed using a Buchner funnel and filter paper to separate aluminum in the wastewater into an aluminum precipitate and a dealuminized solution. A concentration of aluminum in the dealuminized solution was 0.01 g/L, and it was confirmed that aluminum was sufficiently removed from the wastewater.

Next, water is added to the aluminum precipitate as a slurrying solution to slurry the aluminum precipitate, and the slurry concentration was adjusted to 200 g/L. While the slurry was stirred at a room temperature, a calcium hydroxide slurry having a concentration of 20% by mass was added thereto to adjust pH within a range of not less than 9.0 and not more than 9.5 (FIG. 7: pH adjustment—2), whereby an pH-adjusted aluminum precipitate slurry was formed.

Then, 1.5 liters of the dealuminized solution was put into a vessel made of heat-resistant glass and having a capacity of 2 liters, then heated and a solution temperature was maintained at 60 degrees C. A calcium hydroxide slurry having a concentration of 20% by mass was added to the dealuminized solution to adjust pH of the wastewater to 8.5 (pH adjustment—3).

Next, oxidation neutralization treatment was performed such that oxygen gas was blown from a cylinder into the bottom of the vessel through sintered glass at a flow rate for 1000 mL per minute, whereby an oxidized and neutralized slurry was obtained. When pH decreased during the oxidation, a calcium hydroxide slurry was added at any time to maintain the pH between 8.0 and 9.0. During the oxidation, an oxidation-reduction potential was measured by using a silver-silver chloride electrode as a reference electrode. The oxidation-reduction potential stably moved between 50 to 300 mV.

Note that determination of the end point of the wastewater treatment was performed by confirming an analysis value of a manganese concentration, and, by regarding a point where the manganese concentration was reduced to not more than 1 mg/L as an end point, comparison of an amount of a neutralizing agent used was carried out.

Figure 2:
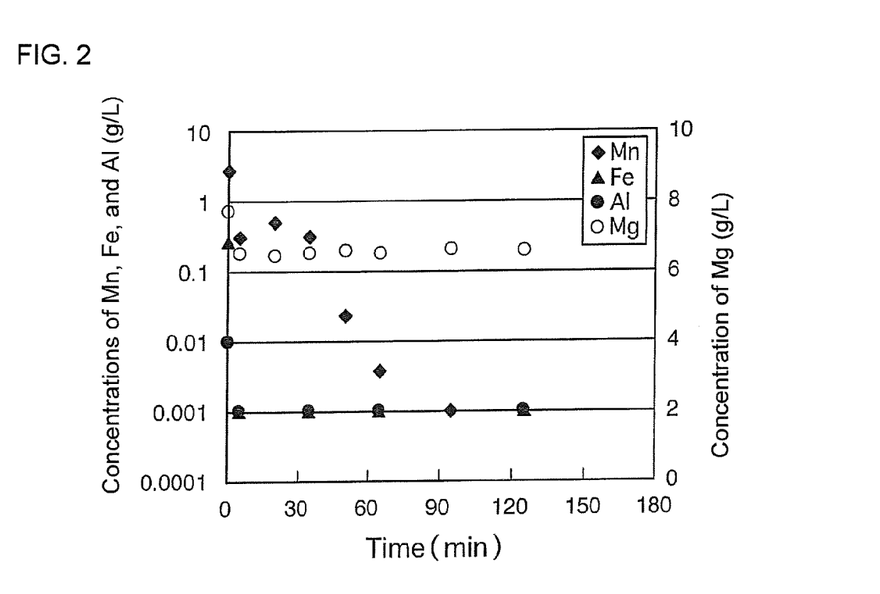
FIG. 2 shows variations of Mn concentration, Mg concentration, Al concentration, and Fe concentration, in the solution, by retention time.

A part of the produced oxidized and neutralized slurry and a part of the produced pH-adjusted aluminum precipitate slurry were mixed and stirred at a room temperature. A sample of the slurry was taken every predetermined time, then filtered and a sample of wastewater was taken to measure variations of a manganese concentration, a magnesium concentration, an aluminum concentration, and an iron concentration, in the wastewater. FIG. 2 shows the variations.

When a large part of aluminum is once separated from the wastewater and oxidation neutralization treatment is performed and then a stabilized precipitate is mixed again, as shown in FIG. 2, with respect to reduction in a manganese concentration in the wastewater, which is associated with formation of a manganese precipitate, variation of a magnesium concentration is very small, and therefore it is understood that, while magnesium is prevented from being precipitated, a manganese precipitate can be obtained.

Note that an amount of the calcium hydroxide added in Example 1 was 0.353 mol per liter of the wastewater original solution.

Furthermore, the remaining two kinds of slurries were solid-liquid separated individually to separate into a demanganized wastewater and a manganese precipitate, a filtrate, and an aluminum hydroxide precipitate (after stabilization).

Comparative Example 1

Without being stabilized, an aluminum hydroxide was mixed with an oxidized and neutralized slurry and neutralized.

Figure 9:
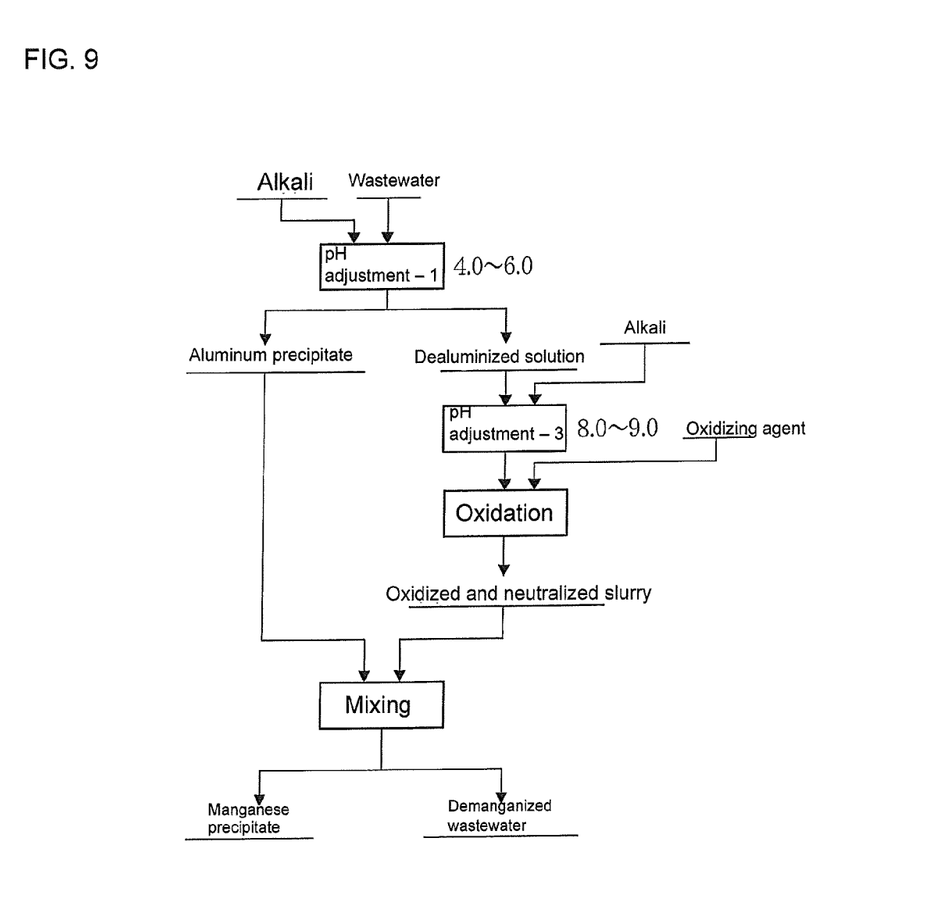
FIG. 9 shows a process flowchart of Comparative Example 1.

According to a process flowchart shown in FIG. 9, a sulfuric acid acidified wastewater having the same composition as in Example 1 was used, and, as was the case with Example 1, neutralized by adding a calcium hydroxide to adjust pH of the wastewater to 4 to 6, followed by filtering to separate an aluminum precipitate, and then pH adjustment was performed to adjust pH of a dealuminized solution in a range of not less than 8.0 and not more than 9.0, followed by blowing oxygen gas to oxidize the dealuminized solution.

The obtained oxidized and neutralized slurry was mixed with the separated aluminum precipitate, and neutralized until the concentration of metal ions (Mn) in the solution became not more than 1 mg/L. Then, filtering was performed using a Buchner funnel and filter paper to separate into a manganese precipitate and a demanganized wastewater.

In the case of Comparative Example 1, an amount of calcium hydroxide used for the reaction was 0.427 mol per liter of wastewater original solution, and as a result, increased by 21% compared with the Example of the present invention.

Comparative Example 2

Neither stabilization of aluminum hydroxide nor separation of manganese by oxidation was performed.

A sulfuric acid acidified wastewater having the same composition as in Example 1 was used, and neutralized by adding a calcium hydroxide at a room temperature, and a pH of the wastewater was adjusted to be maintained in a range of 8.0 to 9.0, followed by filtering without performing oxidation treatment to separate into a manganese precipitate and a demanganized wastewater.

Figure 5:
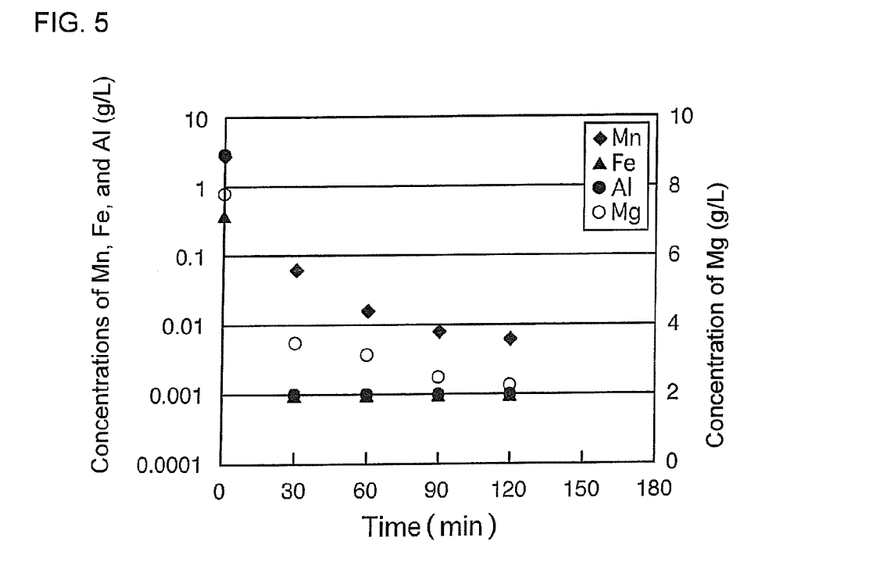
FIG. 5 shows variations of Mn concentration, Mg concentration, Al concentration, and Fe concentration, in the solution, by retention time.

Oxidation neutralization treatment was performed for the demanganized wastewater, and the elapsed time and variations of a manganese concentration, a magnesium concentration, an aluminum concentration, and an iron concentration, in the demanganized wastewater, were measured. FIG. 5 shows the results.

From FIG. 5, it is understood that, when, while aluminum coexists in the wastewater, oxidation neutralization treatment is performed, then magnesium precipitates before manganese does, and furthermore, a precipitate formation cannot be clearly performed, accordingly magnesium and manganese cannot be separated.

In the case of Comparative Example 2, an amount of a calcium hydroxide used for the reaction was 0.472 mol per liter of wastewater original solution, and as a result, increased by 34% compared with the above-mentioned Example 1, and by 11% even compared with Comparative Example 1.

Comparative Example 3

By using a sulfuric acid acidified wastewater having the same composition as in Example 1, wastewater treatment was performed by a manganese removal method disclosed in Patent Literature 1.

In the same manner as in Patent Literature 1, pH adjustment was performed, then, oxidization was carried out using oxygen. An obtained oxidized and neutralized slurry was neutralized until the concentration of metal ions (Mn) in the solution became not more than 1 mg/L. Then, filtering was performed using a Buchner funnel and filter paper to separate into a manganese precipitate and a demanganized wastewater.

An amount of a calcium hydroxide used for the reaction was 0.438 mol per liter of wastewater original solution, and as a result, increased by 24% compared with Example 1.

As mentioned above, it is understood that, compared with Comparative Example 1, Comparative Example 2, and Comparative Example 3, it is easier in Example 1 of the present invention to greatly control an amount of neutralizing agent consumed.

Example 2

Next, air was used as an oxidizing agent and the pressure was varied.

Figure 3:
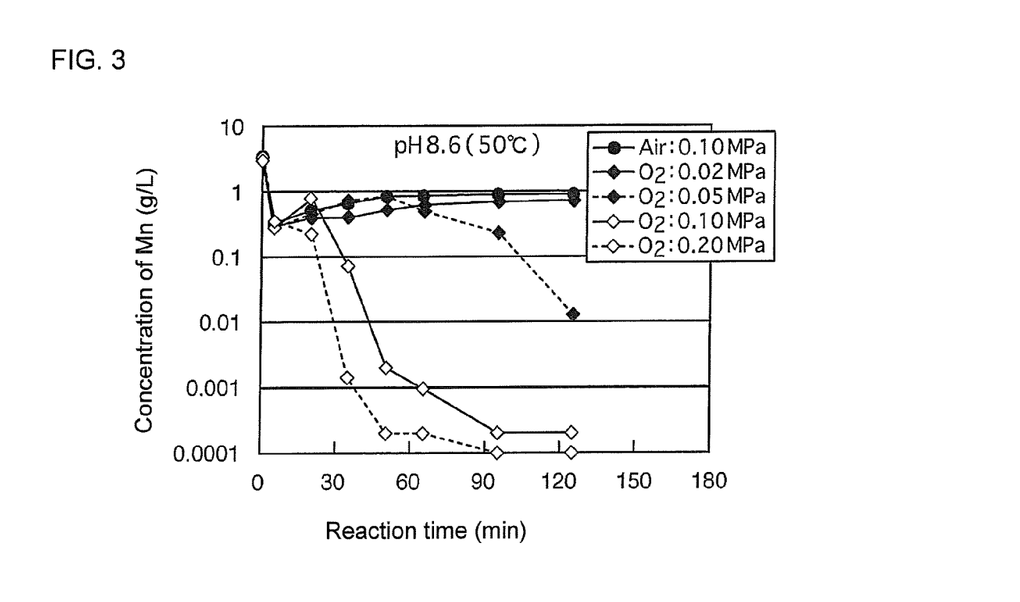
FIG. 3 shows a variation of Mn concentration by pressure of air or pure oxygen gas and reaction time (retention time).

The same procedure as in Example 1 was carried out, except that, in the step (3) for removing manganese, a calcium hydroxide slurry was added to adjust pH to 8.5, and then, pressure between 0.02 to 0.2 MPa was added using oxygen gas or air, whereby a manganese concentration and a magnesium concentration, in the solution, were obtained and FIG. 3 showed the results.

As shown in FIG. 3, it is understood that, by blowing oxygen gas, manganese ions are oxidized to form a precipitate, whereby a manganese concentration can be reduced. On the other hand, also when air is used, a precipitate can be formed, but, compared with the case of using oxygen gas, a reaction rate is slower, and, practically, it is more preferable to use oxygen gas.

Figure 4:
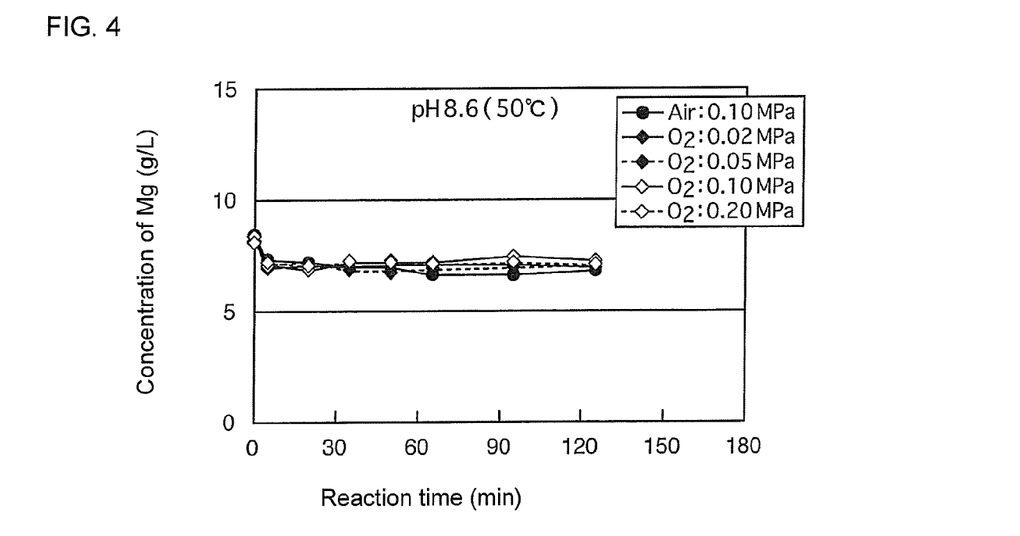
FIG. 4 shows a variation of Mg concentration by pressure of air or pure oxygen gas and reaction time (retention time).

In addition, FIG. 4 shows the case where, with a pressure load of air or oxygen gas, a retention time (reaction time) was varied, and as shown in FIG. 4, a magnesium concentration does not vary, and magnesium can be prevented from being coprecipitated the manganese precipitate.

Example 3

Measured was variation with time of a mixed solution which was obtained by mixing a pH-adjusted aluminum slurry and an oxidized and neutralized slurry, each formed in the steps (2) and (3).

Figure 8:
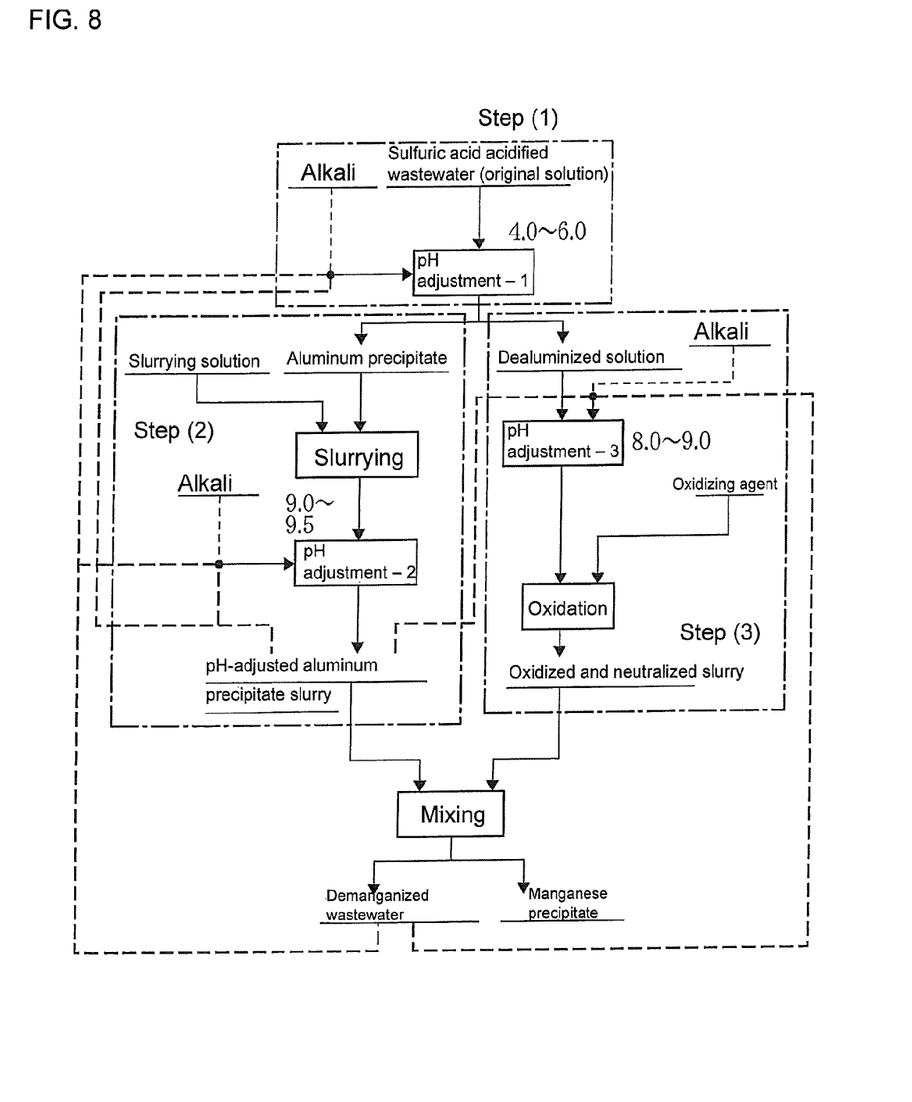
FIG. 8 shows a process flowchart of a wastewater treatment method of Example 3.

According to a process flowchart shown in FIG. 8, first, a sulfuric acid acidified wastewater having the same composition as in Example 1 was used and, as was the case with Example 1, neutralized by adding a calcium hydroxide to adjust pH of the wastewater to 4 to 6, followed by filtering to separate an aluminum precipitate, and then a dealuminized solution was pH-adjusted in the same manner as in Example 1, then oxidized using oxygen to reduce a manganese concentration to not more than 1 mg/L, whereby an oxidized and neutralized slurry in which magnesium remains in the liquid portion was formed. The pH of this slurry was 8.5.

The separated aluminum precipitate was slurried, and the pH was raised to 9.1 by adding slaked lime, whereby metal ions were fixed by full neutralization.

Table 1 shows pH and contents of aluminum, manganese, magnesium, and nickel of both of the slurries.

| Sample | Elapsed time after mixing | Slurry pH | Concentration [g/L] | | | |
|---|---|---|---|---|---|---|
| | | | AL | Mn | Mg | Ni |
| Oxidized and neutralized slurry | — | 8.5 | <0.001 | <0.001 | 6.21 | <0.001 |
| pH-adjusted aluminum slurry | — | 9.0 | <0.001 | <0.001 | <0.001 | <0.001 |
| Mixed slurry | 15 min | 7.8 | <0.001 | 0.002 | 4.96 | <0.001 |
| | 24 hr | 7.5 | <0.001 | 0.004 | 4.93 | <0.001 |

Table 1 shows that a magnesium concentration succeeded in being controlled in the same level as after oxidation, but, when both of the slurries were mixed, the pH decreased to 7.8, and, after 24 hours, manganese was re-eluted up to 4 mg/L of a manganese concentration.

The present invention is applicable to obtain wastewater, in which manganese was removed, from sulfuric acid acidified wastewater containing aluminum ions, magnesium ions, and manganese ions, while an amount of alkali used for pH-adjustment is controlled.

What is claimed is:

1. A wastewater treatment method for obtaining demanganized wastewater from sulfuric acid acidified wastewater obtained by processing nickel oxide ore and containing aluminum, magnesium, and manganese, comprising:
   adjusting the pH of the sulfuric acid acidified wastewater to not less than 4.0 and not more than 5.0 by adding an acid or alkali;
   precipitating aluminum;
   preventing coprecipitation of magnesium with aluminum; and then
   separating the pH adjusted sulfuric acid acidified wastewater into a dealuminized solution that includes magnesium and manganese and has an aluminum concentration of not more than 0.1 g/L, and an aluminum hydroxide precipitate that includes adhering water and is represented as [Al(OH)$_3$];
   admixing water and the aluminum hydroxide precipitate to form an aluminum slurry;
   adjusting a pH of this aluminum slurry to not less than 9.0 and not more than 9.5; thereby
   forming a pH-adjusted aluminum precipitate slurry including a stabilized aluminum hydroxide precipitate that does not form a precipitate with magnesium; and then
   separating the pH-adjusted aluminum precipitate slurry into the stabilized aluminum hydroxide precipitate and a filtrate including manganese;
   adjusting a pH of the dealuminized solution to a range of not less than 8.0 and not more than 9.0,
   adding an oxidizing agent to the dealuminized solution;
   forming an oxidized and neutralized slurry that includes a trivalent manganese; and then
   solid-liquid separating the oxidized and neutralized slurry into a trivalent manganese precipitate and demanganized wastewater,
   wherein the stabilized aluminum hydroxide precipitate, the filtrate including manganese, and the demanganized wastewater are usable as an alkali used for adjustment of the pH of the sulfuric acid acidified wastewater.

2. The wastewater treatment method according to claim 1, wherein the pH of the sulfuric acid acidified wastewater is adjusted by the addition of an alkali selected from the group consisting of the aluminum hydroxide precipitate, the filtrate, the demanganized wastewater, calcium carbonate, calcium hydroxide, calcium oxide, slaked lime, sodium hydroxide, potassium hydroxide, and a mixture thereof.

3. The wastewater treatment method according to claim 1, wherein the oxidized and neutralized slurry is admixed with the pH-adjusted aluminum precipitate slurry or the aluminum slurry; and then solid-liquid separating this admixture into the trivalent manganese precipitate and the demanganized wastewater.

4. The wastewater treatment method according to claim 1, wherein the oxidizing agent is selected from the group consisting of air, ozone gas, a hydrogen peroxide solution, sulfur dioxide gas, oxygen, and a mixture thereof.

5. The wastewater treatment method according to claim 1, wherein an oxidizing agent is admixed with the dealuminized solution and this admixture is stored in a pressure vessel.

6. The wastewater treatment method according to claim 1, wherein the sulfuric acid acidified wastewater is obtained in such a manner that nickel and cobalt, each contained in a nickel oxide ore, are leached with sulfuric acid by high-pressure acid leaching, and a thus obtained sulfuric acid acidified solution is neutralized to separate impurities, and then is sulfurized to separate nickel and cobalt as a sulfide precipitate.

7. The wastewater treatment method according to claim 1, wherein the pH of the sulfuric acid acidified wastewater, the aluminum slurry, and/or the dealuminized solution is adjusted by addition of the filtrate.

8. The wastewater treatment method according to claim 1, wherein the method forms demanganized wastewater without precipitating magnesium.

9. The wastewater treatment method according to claim 1, wherein the alkali used for adjustment of the pH of the sulfuric acid acidified wastewater is the stabilized aluminum hydroxide precipitate, the filtrate including manganese, and/or the demanganized wastewater.

* * * * *